WILLIAM CLICK.
Improvement in Coupling for Tumbling-Shafts.
No. 126,021.              Patented April 23, 1872.
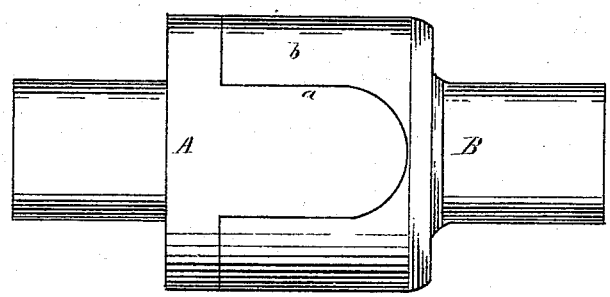
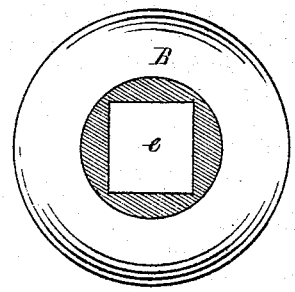
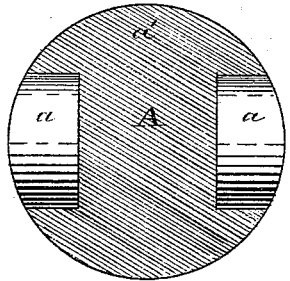
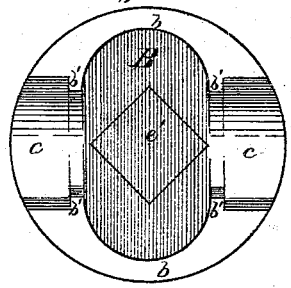
Attest,
B. C. Converse,
E. C. Jones
Wm Click
By B. C. Converse
His atty in fact

UNITED STATES PATENT OFFICE.

WILLIAM CLICK, OF CLARKE COUNTY, OHIO.

IMPROVEMENT IN COUPLINGS FOR TUMBLING-SHAFTS.

Specification forming part of Letters Patent No. 126,021, dated April 23, 1872; antedated April 12, 1872.

I, WILLIAM CLICK, of the county of Clarke and State of Ohio, have invented certain Improvements in Coupling for Tumbling-Shafts, of which the following is a specification:

My invention relates to improvements in the coupling parts of tumbling-shafts. The object of my invention is the construction of a tumbling-shaft that can be used without danger to the operator should any portion of his clothing get in contact with it while in motion. My improvement consists of a coupling, both at the end connected with the horse-power and the separator or other machine run by it, of a clutch-like form. These are used without bolts, keys, or other projecting fastenings through them.

Figure 1 is a view of one of the couplings of my shaft joined together. Fig. 2 is an end view (from the right) of the part B. Fig. 3 is a view of the joining end of A. Fig. 4 is a view of the joining end of B.

A is the male and B the female part of the end couplings. Each of these has a square hole in it for the insertion of the end of the rod, which is made of same form. $a\ a$ are the fork pieces of A, Fig. 3, which slip into spaces $c\ c$ between the jaws $b$, Figs. 1 and 4. To retain the parts in position the jaws $b$ are provided with a flange, $b'$, Fig. 4, which extends sufficiently far around their inside edge to allow the fork pieces $a$ to have a bearing on them, and to hold them in place when the shaft is in motion. The ends of the fork pieces $a$ are rounded, while the jaw pieces $b$ are square, and abut against the square inner face $a'$ of A, Fig. 3. The two sections A and B fit loosely together to allow freedom of motion in the shaft. The large end of the short piece $e'$ is seen inserted in B, Fig. 4, and may be driven in cold, or the piece B heated and shrunk upon it.

When the shaft is in motion the coupling parts accommodate themselves to its movements without binding or rigidity.

I claim as my improvement—

The part A as provided with fork pieces $a\ a$, in combination with the part B provided with jaws $b$ and flanges $b'$ on the same, as and for the purpose hereinbefore set forth.

WILLIAM CLICK.

Attest:
B. C. CONVERSE,
GEO. C. RAWLINS.